United States Patent
Sayama et al.

(10) Patent No.: US 6,921,463 B2
(45) Date of Patent: Jul. 26, 2005

(54) METHOD OF MANUFACTURING ELECTRODE FOR LITHIUM SECONDARY CELL

(75) Inventors: Katsunobu Sayama, Kobe (JP); Hisaki Tarui, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 489 days.

(21) Appl. No.: 10/173,738

(22) Filed: Jun. 19, 2002

(65) Prior Publication Data

US 2003/0031782 A1 Feb. 13, 2003

(30) Foreign Application Priority Data

Jun. 20, 2001 (JP) ........................................ 2001-186494

(51) Int. Cl.[7] ............................ C23C 14/34; C23C 8/00; B05D 5/12; B05D 1/08
(52) U.S. Cl. ............................... 204/192.12; 204/192.11; 427/585; 427/449; 427/402; 427/58; 427/379
(58) Field of Search ................................ 427/585, 449, 427/402, 379, 58; 204/192.11, 192.12

(56) References Cited

U.S. PATENT DOCUMENTS

| | | | |
|---|---|---|---|
| 6,168,661 B1 | 1/2001 | Dinkelman | 118/245 |
| 6,255,017 B1 | 7/2001 | Turner | 429/218.1 |
| 6,273,955 B1 | 8/2001 | Yoshino et al. | 118/718 |
| 6,610,357 B2 * | 8/2003 | Endo et al. | 427/172 |
| 6,649,033 B2 * | 11/2003 | Yagi et al. | 204/192.23 |

FOREIGN PATENT DOCUMENTS

| | | | | |
|---|---|---|---|---|
| WO | 01/29912 A1 | 4/2001 | | H01M/4/02 |
| WO | 01/29914 A1 | 4/2001 | | H01M/4/02 |
| WO | 01/29918 A1 | 4/2001 | | H01M/4/66 |

OTHER PUBLICATIONS

R. Huggins, "Lithium Alloy Negative Electrodes Formed From Convertible Oxides" Solid State Ionics, 113–115, 1998, p. 57–67.

* cited by examiner

*Primary Examiner*—Steven Versteeg
(74) *Attorney, Agent, or Firm*—McDermott Will & Emery LLP

(57) ABSTRACT

An electrode for a lithium secondary cell capable of attaining excellent charge/discharge characteristics with high discharge capacity is obtained by properly controlling a component of a collector diffusing into active material layers formed on both sides of the collector. Embodiments include forming a first active material layer consisting of a plurality of layers on a first surface of a collector, and forming a second active material layer consisting of a plurality of layers on a second surface of the collector. At least one layer constituting the second active material layer is formed before forming all layers constituting the first active material layer, thereby preventing heat for forming at least one of the layers constituting the second active material layer from being applied to all layers constituting the first active material layer.

17 Claims, 2 Drawing Sheets

METHOD OF MANUFACTURING ELECTRODE FOR LITHIUM SECONDARY CELL

BACKGROUND OF THE INVENTION

1. Field of the Invention

The present invention relates to a method of manufacturing an electrode for a lithium secondary cell, and more particularly, it relates to a method of manufacturing an electrode for a lithium secondary cell by forming active material layers on both surfaces of a collector.

2. Description of the Background Art

As to a lithium secondary cell recently subjected to flourishing research and development, cell characteristics such as the charge and discharge voltages, the operating cycle life and the storage characteristics remarkably depend on the employed electrodes. Therefore, active materials employed for the electrodes are improved for improving and upgrading the cell characteristics.

It is known that a cell having high energy density per weight and per volume is obtained when employing lithium metal as a negative active material. In this case, lithium is deposited by charging and dissolved by discharging on a negative electrode. When the cell is repetitively charged and discharged, lithium is repetitively deposited and dissolved on the negative electrode. Thus, lithium is disadvantageously dendritically deposited on the negative electrode. Consequently, internal shorting is disadvantageously caused.

To this end, there has been proposed a lithium secondary cell suppressing the aforementioned dendritic deposition of lithium by employing aluminum, silicon or tin electrochemically alloyed with lithium in charging as a negative electrode active material, as reported in Solid State Ionics, 113–115, p. 57 (1998), for example. Among these materials, silicon having particularly large theoretical capacity is a prospective material as the active material for the negative electrode of a cell exhibiting high capacity.

The assignee of the present invention has proposed an electrode for a lithium secondary cell having a negative electrode active material layer consisting of a microcrystalline silicon layer or an amorphous silicon layer formed on a collector by CVD or sputtering in International Laying-Open No. WO01/29912. The assignee has also proposed an electrode for a lithium secondary cell having active material layers consisting of microcrystalline silicon layers or amorphous silicon layers formed on both surfaces of a plate collector by plasma CVD in International Laying-Open No. WO01/29918.

In the aforementioned technique proposed by the assignee, active material layers each consisting of a plurality of layers may be formed on both surfaces of a collector when the microcrystalline silicon layers or the amorphous silicon layers are formed on both surfaces of the collector by plasma CVD or the like.

When a first active material layer consisting of a plurality of layers is continuously formed on a first surface of the collector for thereafter continuously forming a second active material layer consisting of a plurality of layers on a second surface of the collector in this case, the first active material layer formed in advance is re-heated in formation of the second active material layer. Therefore, the component of the collector disadvantageously excessively diffuses into the first active material layer formed in advance. Thus, it follows that the component of the collector diffuses into the first and second active material layers formed on the first and second surfaces of the collector respectively in different states, and hence it is disadvantageously difficult to control the diffusion states in the first and second active material layers formed on the first and second surfaces of the collector respectively.

In general, therefore, it is difficult to obtain electrodes for a lithium secondary cell having high charge/discharge capacity and excellent operating cycle characteristics.

SUMMARY OF THE INVENTION

An object of the present invention is to provide a method of manufacturing an electrode for a lithium secondary cell capable of attaining high discharge capacity and excellent charge/discharge cycle characteristics when forming a plurality of active material layers on both surfaces of a collector.

Another object of the present invention is to control the component of the collector to a prescribed diffusion state into the active material layers when forming the plurality of active material layers on both surfaces of the collector in the aforementioned method of manufacturing an electrode for a lithium secondary cell.

In order to attain the aforementioned objects, a method of manufacturing an electrode for a lithium secondary cell according to an aspect of the present invention comprises steps of forming a first active material layer consisting of a plurality of layers on a first surface of a collector by a method supplying raw material through discharge into a vapor phase and forming a second active material layer consisting of a plurality of layers on a second surface of the collector by the method supplying raw material through discharge into a vapor phase, while forming at least one layer constituting the second active material layer before forming all layers constituting the first active material layer. According to the present invention, the "method supplying raw material through discharge into a vapor phase" is a wide concept including PVD (physical vapor deposition) such as sputtering and vapor deposition and CVD (chemical vapor deposition) such as plasma CVD, for example.

In the method of manufacturing an electrode for a lithium secondary cell according to this aspect, at least one layer constituting the second active material layer is so formed before forming all layers constituting the first active material layer that heat for forming at least one layer constituting the second active material layer can be prevented from being applied to all layers constituting the first active material layer. Thus, the component of the collector can be prevented from excessively diffusing into the first active material layer in formation of at least one layer constituting the second active material layer, whereby the first and second active material layers can be readily controlled to prescribed diffusion states. Consequently, discharge capacity can be increased and excellent operating cycle characteristics can be obtained.

The method of manufacturing an electrode for a lithium secondary cell according to the aforementioned aspect preferably forms an (n+1)-th layer constituting the first active material layer and an (n+1)-th layer constituting the second active material layer after forming an n-th layer constituting the first active material layer and an n-th layer constituting the second active material layer. According to this structure, heat for forming the n-th layer of the second active material layer can be prevented from being applied to the (n+1)-th layer constituting the first active material layer, for example.

Thus, the component of the collector can be prevented from excessively diffusing into the first active material layer in formation of the n-th layer constituting the second active material layer, whereby the first and second active material layers can be readily controlled to prescribed diffusion states. Consequently, discharge capacity can be increased and excellent operating cycle characteristics can be obtained.

In this case, the method may form a first layer constituting the first active material layer, thereafter form a first layer constituting the second active material layer, thereafter form a second layer constituting the first active material layer, thereafter form a second layer constituting the second active material layer, thereafter form a third layer constituting the first active material layer, and thereafter form a third layer constituting the second active material layer. When the layers constituting the first active material layer and those constituting the second active material layer are alternatively formed in the aforementioned manner, heat for forming the second layer of the second active material layer can be prevented from being applied to the third layer of the first active material layer, for example. Thus, the component of the collector can be prevented from excessively diffusing into the first active material layer in formation of the second layer of the second active material layer. Alternatively, the method may form a first layer constituting the first active material layer, thereafter continuously form first and second layers constituting the second active material layer, thereafter continuously form second and third layers constituting the first active material layer, and thereafter form a third layer constituting the second active material layer. Also according to this structure, heat for forming the second layer of the second active material layer can be prevented from being applied to the third layer of the first active material layer, for example, and hence the component of the collector can be prevented from excessively diffusing into the first active material layer in formation of the second layer of the second active material layer.

In the aforementioned method of manufacturing an electrode for a lithium secondary cell, the step of forming the first active material layer preferably includes a step of forming a first active material layer consisting of either an amorphous layer or a microcrystalline layer, and the step of forming the second active material layer preferably includes a step of forming a second active material layer consisting of either an amorphous layer or a microcrystalline layer. According to this structure, first and second active material layers having excellent characteristics can be formed by the method supplying raw material through discharge into a vapor phase.

In the aforementioned method of manufacturing an electrode for a lithium secondary cell, the first active material layer and the second active material layer preferably contain at least either silicon or germanium. When such a material is employed, the first and second active material layers can be readily formed by the method supplying raw material through discharge into a vapor phase. When first and second active material layers mainly composed of silicon are employed, high charge/discharge capacity can be obtained.

In the aforementioned method of manufacturing an electrode for a lithium secondary cell, at least either the step of forming the first active material layer or the step of forming the second active material layer preferably includes a step of forming at least one layer constituting at least either the first active material layer or the second active material layer at a forming temperature lower than a forming temperature for a layer located immediately under this layer. According to this structure, the diffusion state of the component of the collector diffusing into the layer located immediately under this layer is inhibited from being changed by formation of the upper layer. Thus, a prescribed diffusion state can be attained with excellent controllability.

In this case, the step of forming the first active material layer preferably includes a step of forming the first active material layer so that a forming temperature for a layer coming into contact with the first surface of the collector is higher than a forming temperature for the remaining layers, and the step of forming the second active material layer preferably includes a step of forming the second active material layer so that a forming temperature for a layer coming into contact with the second surface of the collector is higher than a forming temperature for the remaining layers. According to this structure, the diffusion state of the component of the collector with respect to the layers in contact with the first and second surfaces of the collector is inhibited from being changed by formation of the remaining layers, whereby the component of the collector with respect to the layers in contact with the first and second surfaces of the collector can be readily controlled to a prescribed diffusion state.

In the aforementioned method of manufacturing an electrode for a lithium secondary cell, the step of forming the first active material layer and the step of forming the second active material layer preferably include a step of forming all layers constituting the first active material layer and the second active material layer substantially at the same forming temperature. According to this structure, all layers constituting the first and second active material layers can be formed at a single forming temperature, whereby the process of forming the first and second active material layers can be simplified. In this case, the step of forming the first active material layer and the step of forming the second active material layer preferably include a step of forming all layers constituting the first active material layer and the second active material layer at a forming temperature lower than about 250° C. According to this structure, the element forming the collector can be inhibited from excessively diffusing into the active material layers, whereby the characteristics of the collector can be prevented from deterioration. In this case, the step of forming the first active material layer and the step of forming the second active material layer preferably include a step of forming all layers constituting the first active material layer and the second active material layer at a forming temperature higher than about 120° C. According to this structure, the element forming the collector can be inhibited from insufficiently diffusing into the active material layers, whereby the characteristics of the collector can be prevented from deterioration.

In the aforementioned method of manufacturing an electrode for a lithium secondary cell, the step of forming the first active material layer preferably includes a step of forming such a first diffusion layer that the component of the collector diffuses to constitute a solid solution at least as a layer coming into contact with the first surface of the collector, and the step of forming the second active material layer preferably includes a step of forming such a second diffusion layer that the component of the collector diffuses to constitute a solid solution at least as a layer coming into contact with the second surface of the collector. According to this structure, the first and second diffusion layers can provide excellent adhesion between the collector and the first and second active material layers. Consequently, discharge capacity can be increased and excellent operating cycle characteristics can be obtained.

In this case, the steps of forming the first diffusion layer and the second diffusion layer include a step of forming a layer coming into contact with the first surface of the collector and a layer coming into contact with the second surface of the collector and thereafter performing heat treatment thereby forming such first and second diffusion layers that the component of the collector diffuses to constitute a solid solution. According to this structure, the first and second diffusion layers can be formed with proper diffusion of the component of the collector due to the heat treatment, whereby the first and second diffusion layers can provide excellent adhesion between the collector and the first and second active material layers.

In the aforementioned method of manufacturing an electrode for a lithium secondary cell, the step of forming the first active material layer preferably includes a step of forming the first active material layer consisting of the plurality of layers without exposure to the atmosphere by the method supplying raw material through discharge into a vapor phase, and the step of forming the second active material layer preferably includes a step of forming the second active material layer consisting of the plurality of layers without exposure to the atmosphere by the method supplying raw material through discharge into a vapor phase. According to this structure, excellent operating cycle characteristics can be obtained. This point has already been confirmed in Examples described later.

The aforementioned method of manufacturing an electrode for a lithium secondary cell preferably employs at least any of plasma CVD, high-frequency magnetron sputtering, dc magnetron sputtering, electron-beam evaporation and plasma spraying as the method supplying raw material through discharge into a vapor phase.

In the aforementioned method of manufacturing an electrode for a lithium secondary cell, the collector preferably has a thickness of at least 5 µm and not more than 40 µm. According to this structure, the collector can be prevented from such inconvenience that the same is broken in charging/discharging and incapable of collecting current to result in reduction of capacity when the thickness thereof is smaller than 5 µm. The collector can also be prevented from such inconvenience that the weight or the volume of the electrode is increased while leaving the charge/discharge capacity intact to reduce energy density when the thickness thereof is larger than 40 µm.

In the aforementioned method of manufacturing an electrode for a lithium secondary cell, the steps of forming the first active material layer and the second active material layer preferably include a step of forming a negative electrode of the lithium secondary cell.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Examples of the present invention are now specifically described.

Figure 1:
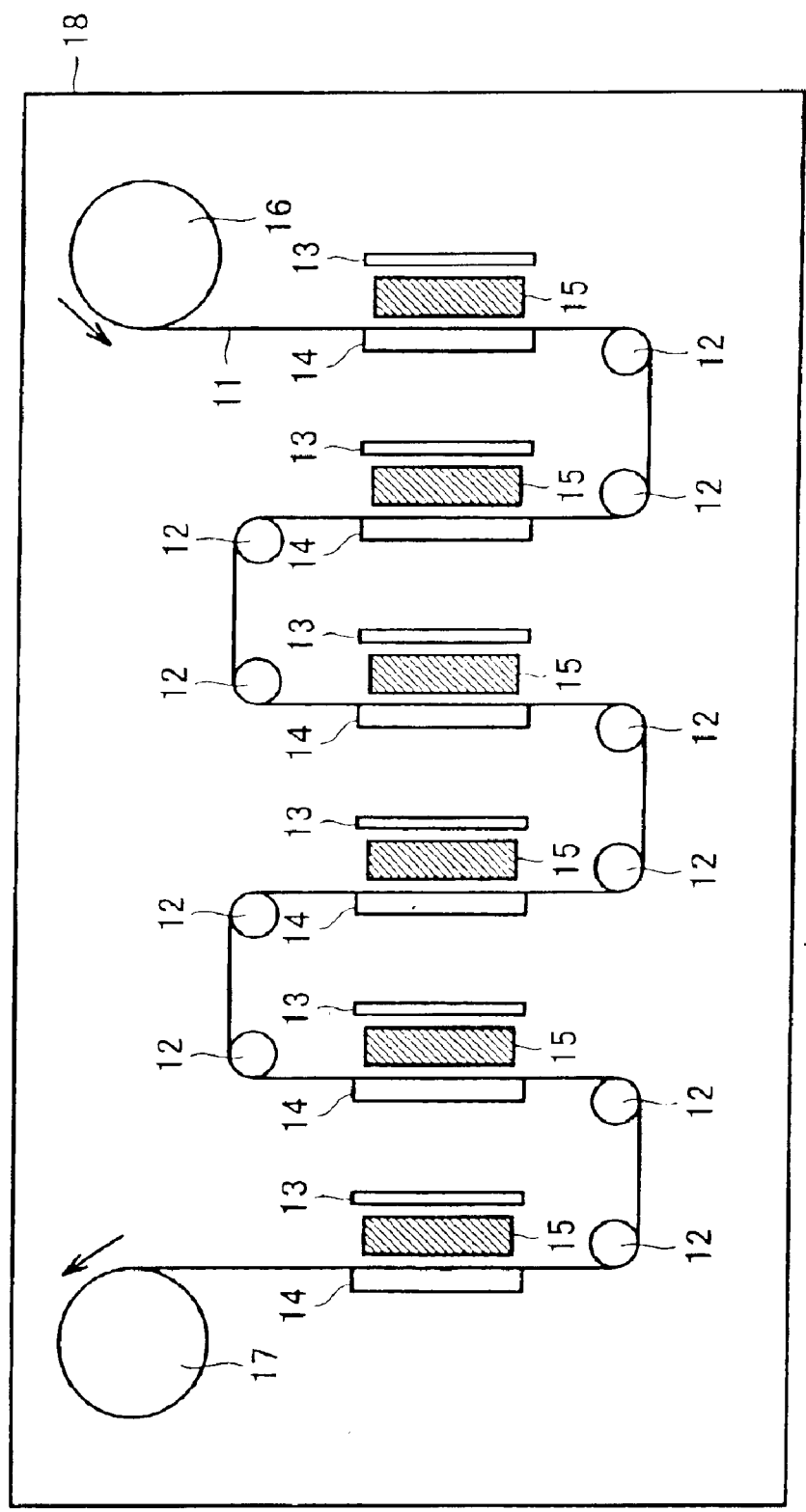
FIG. 1 is a schematic diagram showing the overall structure of a magnetron sputtering formation apparatus employed in each Example of the present invention.

Before describing Examples, a high-frequency magnetron sputtering formation apparatus employed in each Example is described. FIG. 1 is a schematic diagram showing the overall structure of the magnetron sputtering formation apparatus employed in each Example of the present invention. As shown in FIG. 1, this high-frequency magnetron sputtering formation apparatus comprises a plurality of support rollers 12 supporting a collector 11 on a plurality of positions, a plurality of targets 13, a plurality of substrate heating/cooling mechanisms 14, a feed roller 16 feeding the collector 11, a take-up roller 17 taking up the collector 11 and a vacuum chamber 18.

The targets 13 and the substrate heating/cooling mechanisms 14 are arranged on six positions, to be capable of forming three active material layers on each of the surface and the back surface of the collector 11. Discharge areas 15 are formed between the targets 13 and the collector 11.

The following Examples were carried out with the high-frequency magnetron sputtering formation apparatus having the aforementioned structure:

EXAMPLE 1

Figure 2:
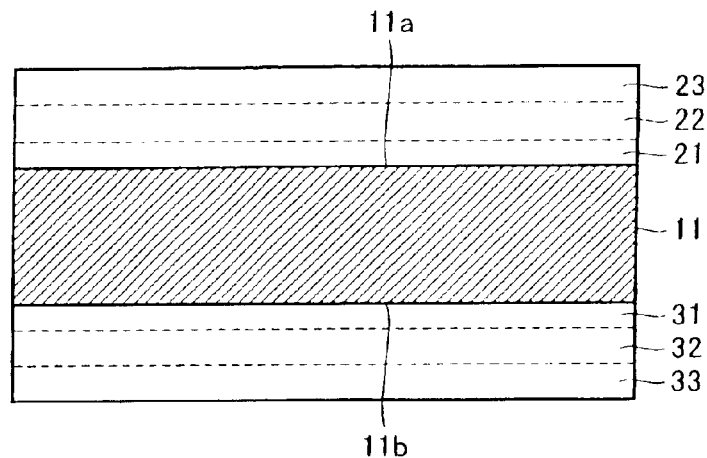
FIG. 2 is a sectional view showing the structure of an electrode (negative electrode) prepared according to the present invention.

First, a substrate consisting of electrolytic copper foil (copper is a metallic element forming no solid solution with lithium) having a thickness of 25 µm was prepared as a collector 11. As shown in FIG. 2, a first active material layer consisting of an amorphous silicon layer having a three-layer structure of a first A layer 21, a second A layer 22 and a third A layer 23 was formed on a first surface 11a of the collector 11 while forming a second active material layer consisting of an amorphous silicon layer having a three layer structure of a first B layer 31, a second B layer 32 and a third B layer 33 on a second surface 11b of the collector 11.

In this case, a p-type single-crystalline silicon target having specific resistance of 30 Ω·cm to 60 Ω·m and a size of 15 cm by 30 cm by 5 mm arranged on a copper backing plate was employed as each target 13 for supplying raw material in the high-frequency magnetron sputtering formation apparatus shown in FIG. 1. The vacuum chamber 18 was vacuumized to not more than $1 \times 10^{-3}$ Pa, and thereafter argon gas was introduced from a gas inlet (not shown) for adjusting the internal pressure of the vacuum chamber 18 to 0.5 Pa. In this state, the collector 11 of copper foil was delivered at a speed of 5 cm/min., for forming the layers 21, 22, 23, 31, 32 and 33 thereon in thicknesses of 2 µm respectively at power density levels, target-to-substrate distances and forming temperatures shown in Table 1 respectively.

TABLE 1

| | First A Layer | First B Layer | Second A Layer | Second B Layer | Third A Layer | Third B Layer |
|---|---|---|---|---|---|---|
| Power Density (W/cm$^2$) | 5 | 5 | 3 | 3 | 3 | 3 |
| Target-to-Substrate Distance (cm) | 10 | 10 | 8 | 8 | 8 | 8 |
| Forming Temperature (° C.) | 250 | 250 | 180 | 180 | 120 | 120 |

According to Example 1, the forming temperatures were gradually reduced from 250° C. for the first layers (the first A layer 21 and the first B layer 31) to 180° C. for the second layers (the second A layer 22 and the second B layer 32) and 120° C. for the third layers (the third A layer 23 and the third B layer 33).

In Example 1, the layers constituting the first and second active material layers were formed in order of the first A layer 21→the first B layer 31→the second A layer 22→the second B layer 32→the third A layer 23→the third B layer 33. In other words, the first A layer 21 was formed on the first surface 11a of the collector 11, followed by formation of the first B layer 31 on the second surface 11b of the collector 11. Then, the second A layer 22 was formed on the first A layer 21 provided on the first surface 11a of the collector 11, followed by formation of the second B layer 32 on the first B layer 31 provided on the second surface 11b of the collector 11. Further, the third A layer 23 was formed on the second A layer 22 provided on the first surface 11a of the collector 11, followed by formation of the third B layer 33 on the second B layer 32 provided on the second surface 11b of the collector 11. In other words, the layers 21, 31, 22, 32, 23 and 33 were alternately formed on the first and second surfaces 11a and 11b of the collector 11.

Thus, the first and second active material layers consisting of amorphous silicon layers of 6 μm in thickness were formed on the first and second surfaces 11a and 11b of the collector 11 respectively, thereby obtaining an electrode 1 according to Example 1.

EXAMPLE 2

An electrode 2 according to Example 2 was prepared similarly to Example 1 while changing only the order of forming layers constituting first and second active material layers. More specifically, the first and second active material layers were prepared by forming first to third A layers 21, 22 and 23 and first to third B layers 31, 32 and 33 in order of the first A layer 21→the first B layer 31→the second B layer 32→the second A layer 22→the third A layer 23→the third B layer 33. In other words, the first A layer 21 was formed on a first surface 11a of a collector 11, followed by continuous formation of the first and second B layers 31 and 32 on a second surface 11b of the collector 11 in Example 2. Thereafter the second and third A layers 22 and 23 were continuously formed on the first A layer 21 provided on the first surface 11a of the collector 11. Further, the third B layer 33 was formed on the second B layer 32 provided on the second surface 11b of the collector 11.

EXAMPLE 3

According to Example 3, a collector 11 provided with a first A layer 21, a first B layer 22, a second A layer 31 and a second B layer 32 formed in this order for constituting first and second active material layers was taken out from the vacuum chamber 18 into the atmosphere, in order to study influence exerted on the collector 11 exposed to the atmosphere in the process of forming the first and second active material layers. The collector 11 consisting of copper foil was set in the vacuum chamber 18 again on a position closer to the feed roller 16 for forming a third A layer 23 and a third B layer 33 in this order, thereby preparing an electrode 3 according to Example 3. The remaining forming conditions for Example 3 are similar to those in Example 1.

EXAMPLE 4

An electrode 4 according to Example 4 was prepared by forming all of first to third A layers 21 to 23 and first to third B layers 31 to 33 constituting first and second active material layers respectively at a temperature of 250° C., in order to study influence exerted by a constant (high) forming temperature. The remaining forming conditions for Example 4 are similar to those in Example 1.

EXAMPLE 5

Similarly to the aforementioned Example 4, an electrode 5 according to Example 5 was prepared by forming all of first to third A layers 21 to 23 and first to third B layers 31 to 33 constituting first and second active material layers respectively at a temperature of 120° C., in order to study influence exerted by a constant (low) forming temperature. The remaining forming conditions for Example 5 are similar to those in Example 1.

COMPARATIVE EXAMPLE 1

An electrode 6 according to comparative example 1 was prepared by forming first to third A layers 21 to 23 and first to third B layers 31 to 33 constituting first and second active material layers respectively in order of the first A layer 21→the second A layer 22→the third A layer 23→the first B layer 31→the second B layer 32→the third B layer 33. In other words, the first to third A layers 21, 22 and 23 were continuously formed on a first surface 11a of a collector 11, followed by continuous formation of the first to third B layers 31, 32 and 33 on a second surface 11b of the collector 11 in comparative example 1. The remaining forming conditions for comparative example 1 are similar to those in Example 1.

COMPARATIVE EXAMPLE 2

An electrode 7 according to comparative example 2 was prepared by forming first to third A layers 21 to 23 and first to third B layers 31 to 33 constituting first and second active material layers respectively in the same order as comparative example 1 while setting the forming temperature to 250° C. for all layers 21 to 23 and 31 to 33. The remaining forming conditions for comparative example 2 are similar to those in Example 1.

COMPARATIVE EXAMPLE 3

An electrode 8 according to comparative example 3 was prepared by forming first to third A layers 21 to 23 and first to third B layers 31 to 33 constituting first and second active material layers respectively in the same order as comparative example 1 while setting the forming temperature to 120° C. for all layers 21 to 23 and 31 to 33. The remaining forming conditions for comparative example 3 are similar to those in Example 1.

[Evaluation of Charge/Discharge Characteristics of Lithium Secondary Cell]

Lithium secondary cells were prepared by employing the aforementioned electrodes 1 to 8 according to Examples 1 to 5 and comparative examples 1 to 3 as negative electrodes respectively, and subjected to evaluation of charge/discharge characteristics. Each lithium secondary cell was prepared as follows:

In order to prepare a positive electrode, 90 parts by weight of $LiCoO_2$ powder and 5 parts by weight of artificial graphite powder for serving as a conductive agent were mixed into 5 percent by weight of N-methylpyrrolidone solution containing 5 parts by weight of polyvinylidene fluoride for serving as a binder, thereby preparing a positive electrode mixture slurry. This slurry was applied onto aluminum foil of 20 μm in thickness forming a positive electrode collector with a doctor blade and thereafter dried for forming a positive electrode active material. A positive electrode tab was mounted onto an area of the aluminum foil not coated with the positive electrode active material, thereby completing the positive electrode.

On the other hand, a negative electrode tab was mounted on an area formed with no amorphous silicon layer, thereby completing the negative electrode.

Figure 3:
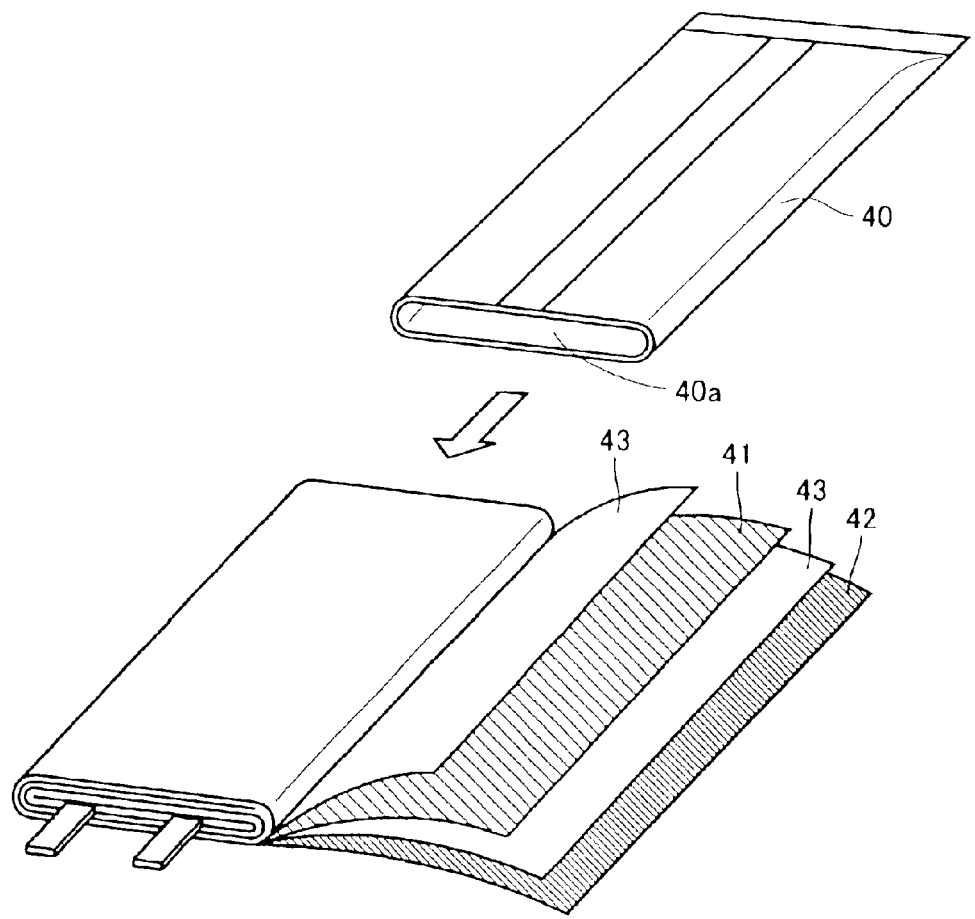
FIG. 3 is an exploded perspective view showing a lithium secondary cell prepared in each Example of the present invention.

A positive electrode 41 and a negative electrode 42 obtained in the aforementioned manner were employed for preparing each lithium secondary cell as shown in FIG. 3. A separator 43 was arranged between the positive electrode 41 and the negative electrode 42 while arranging another separator 43 on the positive electrode 41, so that the positive and negative electrodes 41 and 42 and the separators 43 were flatly wound and inserted into a sheath 40. Then, an electrolyte was injected into the sheath 40 and an opening 40a of the sheath 40 was sealed thereby completing the lithium secondary cell. In this case, the electrolyte was prepared by dissolving 1 mol/l of $LiPF_6$ in a mixed solvent containing ethylene carbonate and diethyl carbonate in a volume ratio 1:1.

An operating cycle test was performed on each lithium secondary cell prepared in the aforementioned manner. Table 2 shows the results. The lithium secondary cell was charged to 4.2 V and thereafter discharged to 2.75 V with a constant current of 140 mA by 25 cycles. Discharge capacity values at the first and the $25^{th}$ cycles were measured along with a capacity retention ratio defined as follows:

Capacity retention ratio (%)=(discharge capacity at the $25^{th}$ cycle/discharge capacity at the first cycle)

TABLE 2

|  | Discharge Capacity at the $1^{st}$ Cycle (mAh) | Discharge Capacity at the $2^{nd}$ Cycle (mAh) | Capacity Retention Ratio (%) |
|---|---|---|---|
| Example 1 (Electrode 1) | 690.2 | 705.3 | 102.3 |
| Example 2 (Electrode 2) | 688.5 | 702.1 | 100.5 |
| Example 3 (Electrode 3) | 685.8 | 698.5 | 93.8 |
| Example 4 (Electrode 4) | 671.9 | 673.8 | 101.2 |
| Example 5 (Electrode 5) | 700.4 | 714.4 | 95.3 |
| Comparative Example 1 (Electrode 6) | 650.6 | 671.2 | 96.8 |
| Comparative Example 2 (Electrode 7) | 600.1 | 602.4 | 90.4 |
| Comparative Example 3 (Electrode 8) | 673.5 | 690.3 | 73.7 |

As shown in Table 2, the lithium secondary cells employing the electrodes 1, 2, 3 and 5 according to Examples 1, 2, 3 and 5 prepared in the inventive method attained superior operating cycle characteristics to the lithium secondary cells employing the electrodes 6, 7 and 8 according to comparative examples 1, 2 and 3. The lithium secondary cell according to Example 3 prepared while exposing the collector 11 to the atmosphere in the process of forming the active material layers exhibited a lower capacity retention ratio as compared with the lithium secondary cells according to Examples 1 and 2. Thus, it has been proved that the surfaces of the active material layers are preferably not exposed to the atmosphere in the process of forming the active material layers, in order to attain superior cycle characteristics.

The lithium secondary cell according to Example 4 prepared by forming all of the layers 21 to 23 and 31 to 33 constituting the active material layers at 250° C. exhibited lower capacity values as compared with those according to the remaining Examples, due to excessive diffusion of copper from the collector 11. Thus, it is understood that the layers 21 to 23 and 31 to 33 constituting the active material layers are preferably formed at a temperature lower than 250° C. in the present invention. When copper excessively diffuses from the collector 11 to the active material layers, adhesion between the collector 11 and the active material layers is deteriorated to deteriorate current collection characteristics, disadvantageously resulting in reduction of the charge/discharge capacity or the like. When all of the layers 21 to 23 and 31 to 33 constituting the active material layers are formed at the same temperature in the present invention, therefore, the temperature is preferably lower than 250° C.

The lithium secondary cell according to Example 5 prepared by forming all of the layers 21 to 23 and 31 to 33 constituting the active material layers at 120° C. exhibited a lower cycle characteristic (capacity retention ratio) as compared with those according to Examples 1, 2 and 4 due to small diffusion of copper from the collector 11 to the active material layers. Also when diffusion of copper from the collector 11 to the active material layers is insufficient, adhesion between the collector 11 and the active material layers is deteriorated to deteriorate current collection characteristics, disadvantageously resulting in reduction of the charge/discharge capacity or the like. When all of the layers 21 to 23 and 31 to 33 constituting the active material layers are formed at the same temperature in the present invention, therefore, the temperature is preferably higher than 120° C.

While the forming temperatures were gradually reduced from 250° C. for the first layers 21 and 31 to 180° C. for the second layers 22 and 32 and 120° C. for the third layers 23 and 33 in Example 1, an effect similar to that of Example 1 was attained also in the following case: When the first layers, i.e., the first A layer 21 and the first B layer 31 were formed at 180° C. and thereafter heat-treated at 250° C. in the same argon atmosphere as that for forming the active material layers without exposure to the atmosphere before forming the second layers, i.e., the second A layer 22 and the second B layer 32, an effect similar to that in Example 1 was attained. This is conceivably because copper diffused from the collector 11 into the first A layer 21 and the first B layer 31 constituting the active material layers due to the heat treatment at 250° C. thereby implementing a structure similar to that of Example 1.

Although the present invention has been described and illustrated in detail, it is clearly understood that the same is by way of illustration and example only and is not to be taken by way of limitation, the spirit and scope of the present invention being limited only by the terms of the appended claims.

For example, while the active material layer consisting of three layers is formed on each of the first and second surfaces 11a and 11b of the collector 11 in each of the aforementioned Examples, the present invention is not restricted to this but a similar effect can be attained also when an active material layer consisting of two or at least four layers is formed on each surface of the collector 11.

When at least one layer constituting the second active material layer is formed before forming all layers constituting the first active material layer, the layers constituting the first active material layer can be prevented from application of heat for forming at least one layer constituting the second active material layer. Thus, the component of the collector 11 can be prevented from excessively diffusing into the first active material layer when forming at least one layer constituting the second active material layer, whereby the first and second active material layers can be readily controlled to a prescribed diffusion state. Consequently, high discharge capacity and excellent operating cycle characteristics can be attained.

While the active material layer consisting of a plurality of layers is formed on each surface of the collector 11 by high-frequency magnetron sputtering in each of the aforementioned Examples, the present invention is not restricted to this but another method may alternatively be employed so far as the method supplies raw material through discharge into a vapor phase. For example, plasma CVD, dc magnetron sputtering, electron-beam evaporation or plasma spraying is conceivably employable.

While the active material is prepared from silicon in each of the aforementioned Examples, the present invention is not restricted to this but germanium, tin, lead, zinc, magnesium, sodium, aluminum, gallium or indium may alternatively be employed. When employing active material layers mainly composed of germanium or silicon germanium, thin films can be readily advantageously formed by the aforementioned method supplying raw material through discharge into a vapor phase.

While each active material layer consists of the amorphous silicon layer in each of the aforementioned Examples, the present invention is not restricted to this but an active material layer consisting of a microcrystalline silicon layer is also employable. No peak in the vicinity of 520 cm$^{-1}$ corresponding to a crystalline region in Raman spectrometric analysis is substantially detected in an amorphous silicon layer, while both of the peak in the vicinity of 520 cm$^{-1}$ corresponding to the crystalline region in Raman spectrometric analysis and a peak in the vicinity of 480 cm$^{-1}$ corresponding to an amorphous region are substantially detected in a microcrystalline silicon layer. Further alternatively, an amorphous germanium layer, a microcrystalline germanium layer, an amorphous silicon germanium alloy layer or a microcrystalline silicon germanium alloy layer can be employed in place of the amorphous silicon layer or the microcrystalline silicon layer.

While the collector 11 is prepared from copper foil in each of the aforementioned Examples, the present invention is not restricted to this but nickel foil or the like is also employable. In this case, foil consisting of a metal, such as copper or nickel, not alloyed with lithium is preferably employed.

While the thickness of the electrolytic copper foil forming the collector 11 is 25 μm in each of the aforementioned Examples, the present invention is not restricted to this but the thickness of the collector 11 is preferably at least 5 μm and not more than 40 μm. If the thickness of the collector 11 is smaller than 5 μm, the collector 11 is broken in charging/discharging and incapable of collecting current, disadvantageously resulting in reduction of the capacity. If the thickness of the collector 11 is larger than 40 μm, the weights and the volumes of the electrodes are increased while the charge/discharge capacity remains unchanged, disadvantageously reducing energy density. Therefore, the thickness of the metal foil forming the collector 11 is preferably at least 5 μm and not more than 40 μm.

What is claimed is:

1. A method of manufacturing an electrode for a lithium secondary cell, comprising steps of:

forming a first active material layer consisting of a plurality of layers on a first surface of a collector by a method supplying raw material through discharge into a vapor phase; and forming a second active material layer consisting of a plurality of layers on a second surface of said collector by said method supplying raw material through discharge into a vapor phase, while forming at least one layer constituting said second active material layer before forming all said layers constituting said first active material layer.

2. The method of manufacturing an electrode for a lithium secondary cell according to claim 1, forming an (n+1)-th layer constituting said first active material layer and an (n+1)-th layer constituting said second active material layer after forming an n-th layer constituting said first active material layer and an n-th layer constituting said second active material layer.

3. The method of manufacturing an electrode for a lithium secondary cell according to claim 2, forming a first layer constituting said first active material layer, thereafter forming a first layer constituting said second active material layer, thereafter forming a second layer constituting said first active material layer, thereafter forming a second layer constituting said second active material layer, thereafter forming a third layer constituting said first active material layer, and thereafter forming a third layer constituting said second active material layer.

4. The method of manufacturing an electrode for a lithium secondary cell according to claim 2, forming a first layer constituting said first active material layer, thereafter continuously forming first and second layers constituting said second active material layer, thereafter continuously forming second and third layers constituting said first active material layer, and thereafter forming a third layer constituting said second active material layer.

5. The method of manufacturing an electrode for a lithium secondary cell according to claim 1, wherein said step of forming said first active material layer includes a step of forming a first active material layer consisting of either an amorphous layer or a microcrystalline layer, and said step of forming said second active material layer includes a step of forming a second active material layer consisting of either an amorphous layer or a microcrystalline layer.

6. The method of manufacturing an electrode for a lithium secondary cell according to claim 1, wherein said first active material layer and said second active material layer contain at least either silicon or germanium.

7. The method of manufacturing an electrode for a lithium secondary cell according to claim 1, wherein at least either said step of forming said first active material layer or said step of forming said second active material layer includes a step of forming at least one layer constituting at least either said first active material layer or said second active material layer at a forming temperature lower than a forming temperature for a layer located immediately under said layer.

8. The method of manufacturing an electrode for a lithium secondary cell according to claim 7, wherein said step of forming said first active material layer includes a step of forming said first active material layer so that a forming temperature for a layer coming into contact with said first surface of said collector is higher than a forming temperature for the remaining layers, and said step of forming said second active material layer includes a step of forming said second active material layer so that a forming temperature for a layer coming into contact with said second surface of said collector is higher than a forming temperature for the remaining layers.

9. The method of manufacturing an electrode for a lithium secondary cell according to claim 1, wherein
said step of forming said first active material layer and said step of forming said second active material layer include a step of forming all layers constituting said first active material layer and said second active material layer substantially at the same forming temperature.

10. The method of manufacturing an electrode for a lithium secondary cell according to claim 9, wherein
said step of forming said first active material layer and said step of forming said second active material layer include a step of forming all said layers constituting said first active material layer and said second active material layer at a forming temperature lower than about 250° C.

11. The method of manufacturing an electrode for a lithium secondary cell according to claim 9, wherein
said step of forming said first active material layer and said step of forming said second active material layer include a step of forming all said layers constituting said first active material layer and said second active material layer at a forming temperature higher than about 120° C.

12. The method of manufacturing an electrode for a lithium secondary cell according to claim 1, wherein
said step of forming said first active material layer includes a step of forming such a first diffusion layer that the component of said collector diffuses to constitute a solid solution at least as a layer coming into contact with said first surface of said collector, and
said step of forming said second active material layer includes a step of forming such a second diffusion layer that the component of said collector diffuses to constitute a solid solution at least as a layer coming into contact with said second surface of said collector.

13. The method of manufacturing an electrode for a secondary cell according to claim 12, wherein
said steps of forming said first diffusion layer and said second diffusion layer include a step of forming a layer coming into contact with said first surface of said collector and a layer coming into contact with said second surface of said collector and thereafter performing heat treatment thereby forming such said first and second diffusion layers that the component of said collector diffuses to constitute a solid solution.

14. The method of manufacturing an electrode for a lithium secondary cell according to claim 1, wherein
said step of forming said first active material layer includes a step of forming said first active material layer consisting of said plurality of layers without exposure to the atmosphere by said method supplying raw material through discharge into a vapor phase, and
said step of forming said second active material layer includes a step of forming said second active material layer consisting of said plurality of layers without exposure to the atmosphere by said method supplying raw material through discharge into a vapor phase.

15. The method of manufacturing an electrode for a lithium secondary cell according to claim 1, employing at least any of plasma CVD, high-frequency magnetron sputtering, dc magnetron sputtering, electron-beam evaporation and plasma spraying as said method supplying raw material through discharge into a vapor phase.

16. The method of manufacturing an electrode for a lithium secondary cell according to claim 1, wherein
said collector has a thickness of at least 5 $\mu$m and not more than 40 $\mu$m.

17. The method of manufacturing an electrode for a lithium secondary cell according to claim 1, wherein
said steps of forming said first active material layer and said second active material layer include a step of forming a negative electrode of said lithium secondary cell.

* * * * *